US011431684B2

United States Patent
Liu et al.

(10) Patent No.: US 11,431,684 B2
(45) Date of Patent: Aug. 30, 2022

(54) DATA RESPONSE METHOD, TERMINAL DEVICE, AND SERVER

(71) Applicant: TENCENT TECHNOLOGY (SHENZHEN) COMPANY LIMITED, Shenzhen (CN)

(72) Inventors: Feifei Liu, Shenzhen (CN); Yong Yang, Shenzhen (CN); Meng Chen, Shenzhen (CN); Yiwen Jia, Shenzhen (CN); Fei You, Shenzhen (CN); Binmin Wen, Shenzhen (CN); Jia Li, Shenzhen (CN); Xuan Zong, Shenzhen (CN); Wuyu Han, Shenzhen (CN); Chuansheng Yu, Shenzhen (CN); Wei Tian, Shenzhen (CN); Yuanbin Chen, Shenzhen (CN); Yaohua Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 16 days.

(21) Appl. No.: 16/389,414

(22) Filed: Apr. 19, 2019

(65) Prior Publication Data
US 2019/0245832 A1 Aug. 8, 2019

Related U.S. Application Data

(63) Continuation of application No. PCT/CN2018/085923, filed on May 8, 2018.

(30) Foreign Application Priority Data

Jun. 9, 2017 (CN) .......................... 201710433020.1

(51) Int. Cl.
*H04L 29/06* (2006.01)
*H04L 9/40* (2022.01)
(Continued)

(52) U.S. Cl.
CPC .......... *H04L 63/0428* (2013.01); *G06F 21/55* (2013.01); *G06F 21/602* (2013.01); *G06F 21/62* (2013.01); *H04L 63/1491* (2013.01)

(58) Field of Classification Search
CPC ......... H04L 41/16; H04L 43/04; H04L 43/08; H04L 43/10; H04L 43/12; H04L 51/12;
(Continued)

(56) References Cited

U.S. PATENT DOCUMENTS 6,310,873 B1 * 10/2001 Rainis ................. H04M 7/1285
370/352
2013/0263226 A1 * 10/2013 Sudia .................. H04L 63/1466
726/4

(Continued)

FOREIGN PATENT DOCUMENTS

CN 101052056 A 10/2007
CN 101053198 A 10/2007
(Continued)

OTHER PUBLICATIONS

Bao et al., "Research on network security of defense based on Honeypot", 2010 International Conference on Computer Application and System Modeling (ICCASM 2010), Date of Conference: Oct. 22-24, 2010.*

(Continued)

*Primary Examiner* — Morshed Mehedi
(74) *Attorney, Agent, or Firm* — Anova Law Group, PLLC

(57) ABSTRACT

Embodiments of the present disclosure disclose a data response method, a terminal device, and a server. The method in the embodiments of the present disclosure includes: sending encrypted information to a terminal device; receiving a first honeypot character, the encrypted information, and user data from the terminal device;
(Continued)

decrypting the encrypted information, to obtain a second honeypot character comprised in the encrypted information; determining whether the first honeypot character sent by the terminal device is the same as the second honeypot character decrypted from the encrypted information; and responding to the user data in response to the first honeypot character being the same as the second honeypot character.

16 Claims, 7 Drawing Sheets

(51) Int. Cl.
*G06F 21/60* (2013.01)
*G06F 21/55* (2013.01)
*G06F 21/62* (2013.01)

(58) Field of Classification Search
CPC ......... H04L 67/08; H04L 67/12; H04L 67/14; H04L 67/20; G06F 21/45; G06F 21/53; G06F 21/55; G06F 21/56; G06F 21/57; G06F 30/20
See application file for complete search history.

(56) References Cited

U.S. PATENT DOCUMENTS

| 2015/0121529 A1* | 4/2015 | Quinlan ................. H04L 67/28 726/23 |
| 2016/0359846 A1* | 12/2016 | Yoshimuta ............. H04L 67/02 |
| 2017/0134405 A1 | 5/2017 | Ahmadzadeh et al. |
| 2018/0007087 A1* | 1/2018 | Grady ................. H04L 63/0428 |
| 2018/0293379 A1* | 10/2018 | Dahan ................... G06F 21/566 |

FOREIGN PATENT DOCUMENTS

| CN | 105426433 A | 3/2016 |
| CN | 106341819 A | 1/2017 |
| CN | 106651361 A | 5/2017 |

OTHER PUBLICATIONS

The World Intellectual Property Organization (Wipo) International Search Report for PCT/CN2018/085923 dated Jun. 27, 2018 5 Pages (including translation).

* cited by examiner

DATA RESPONSE METHOD, TERMINAL DEVICE, AND SERVER

RELATED APPLICATIONS

The present disclosure claims priority to PCT Application No. PCT/CN2018/085923, filed on May 8, 2018, which claims priority to Chinese Patent Application No. 201710433020.1, filed with the Chinese Patent Office on Jun. 9, 2017 and entitled "DATA RESPONSE METHOD, TERMINAL DEVICE, AND SERVER." The two applications are incorporated herein by reference in their entirety.

FIELD OF TECHNOLOGY

The present disclosure relates to the field of computer system security, and in particular, to computer system data responses.

BACKGROUND OF THE DISCLOSURE

With rapid development of Internet and mobile communications technologies, a terminal device can implement more diversified functions.

To ensure security of data stored in the terminal device, in one method provided in the related technology, a server can generate multiple groups of keys. The server can encrypt user data in the terminal device by using a key among the multiple generated keys, to generate ciphertext data, and save the ciphertext data in the terminal device.

However, in the solution provided in the related technology, the server needs to perform complex management of the multiple groups of keys, and storage space of the server is occupied when the server stores multiple groups of keys in the background, thereby reducing operation efficiency of the server. Moreover, once the multiple groups of keys stored in the server are compromised, an attacker can tamper with data of the terminal device arbitrarily and over a long time because the server cannot perceive that the keys are compromised.

SUMMARY

Embodiments of the present disclosure provide a data response method, a terminal device, and a server, to perceive in advance that data of the terminal device is tampered with.

A first aspect of the embodiments of the present disclosure provides a data response method. The method in the embodiments of the present disclosure includes: sending encrypted information to a terminal device; receiving a first honeypot character, the encrypted information, and user data from the terminal device; and decrypting the encrypted information, to obtain a second honeypot character comprised in the encrypted information. The method further includes determining whether the first honeypot character sent by the terminal device is the same as the second honeypot character decrypted from the encrypted information; and responding to the user data in response to the first honeypot character being the same as the second honeypot character.

A second aspect of the embodiments of the present disclosure provides a data response server. The data response server includes a sending unit, configured to send encrypted information to a terminal device; a first receiving unit, configured to receive a first honeypot character, encrypted information, and user data that from the terminal device; a decryption unit, configured to decrypt the encrypted information to obtain a second honeypot character comprised in the encrypted information; and a judging unit, configured to determine whether the first honeypot character sent by the terminal device is the same as the second honeypot character comprised in the encrypted information; and a first determining unit, configured to respond to the user data in response to the first honeypot character being the same as the second honeypot character.

A third aspect of the embodiments of the present disclosure provides a data response method. The method includes obtaining, by a terminal, encrypted information sent by a server; performing, by the terminal, decryption computation on the encrypted information, to obtain a first honeypot character comprised in the encrypted information; sending, by the terminal, a second honeypot character, the encrypted information, and user data to the server; and receiving, by the terminal, response from the server in response to the server determining that a first honeypot character being the same as the second honeypot.

A fourth aspect of the of the present disclosure provides a non-transitory computer-readable storage medium storing computer program instructions. The computer program instructions cause the at least one processor to perform a data response method including: performing, by the terminal, decryption computation on the encrypted information, to obtain a first honeypot character comprised in the encrypted information; sending, by the terminal, a second honeypot character, the encrypted information, and user data to the server; and receiving, by the terminal, response from the server in response to the server determining that a first honeypot character being the same as the second honeypot.

By using the data response method, the terminal device, and the server that are in the present disclosure, because encrypted information cannot be tampered with, by using the encrypted information, the system can check whether a honeypot character sent by the terminal device is consistent with a honeypot character included in the encrypted information. Such a process does not need to consume large amount of storage space of the server, thereby improves the operation efficiency of the server. In addition, operations of the method shown in the embodiments is simple, thereby improving efficiency of the systems. Moreover, in the embodiments of the present disclosure, the system can detect a tampering operation of the terminal device on data before a loss is caused, so that countermeasures can be taken in advance, thereby effectively avoiding breaching of user privacy data. As such, integrality of front-end data of the terminal device can be actively protected, security of a communications system is effectively ensured, and a loss of the communications system is avoided.

DESCRIPTION OF EMBODIMENTS

An embodiment of the present disclosure provides a data response method. The data response method provided in this embodiment is applied to a communications system. To better understand the data response method shown in this embodiment of the present disclosure, the following describes the communications system in detail with reference to FIG. 1.

Figure 1:
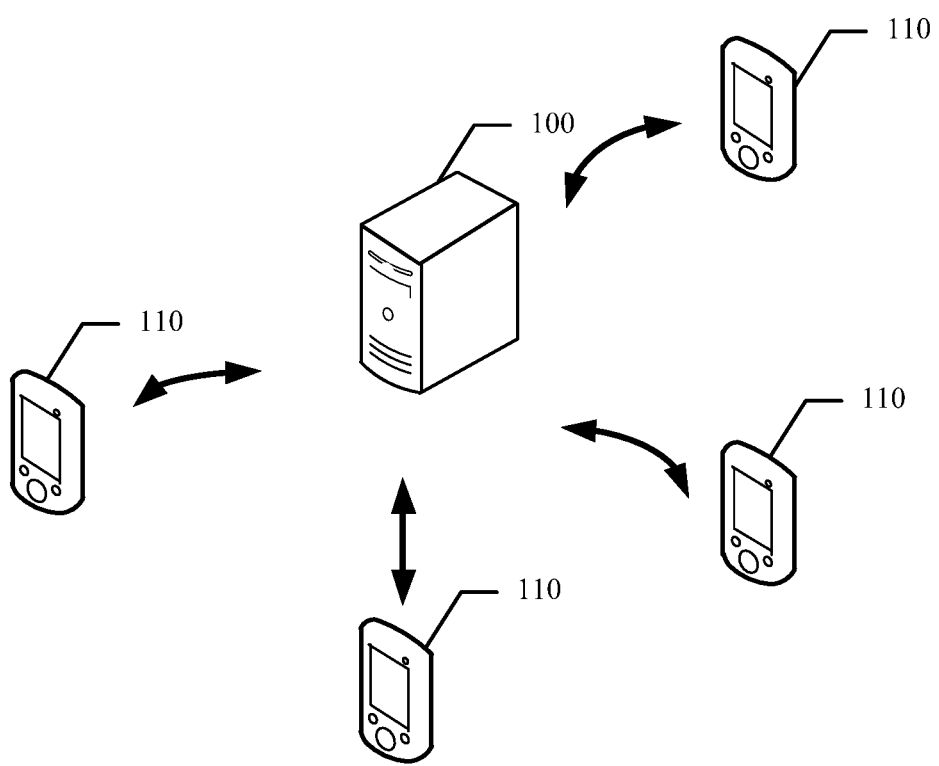
FIG. 1 is a schematic diagram of an embodiment of a communications system according to an embodiment of the present disclosure.

FIG. 1 is a schematic diagram of a communications system according to an embodiment of the present disclosure. The communications system includes a server 100 and at least one terminal device 110.

The server 100 can exchange data with the terminal device 110, thereby implementing the data response method shown in this embodiment.

Figure 2:
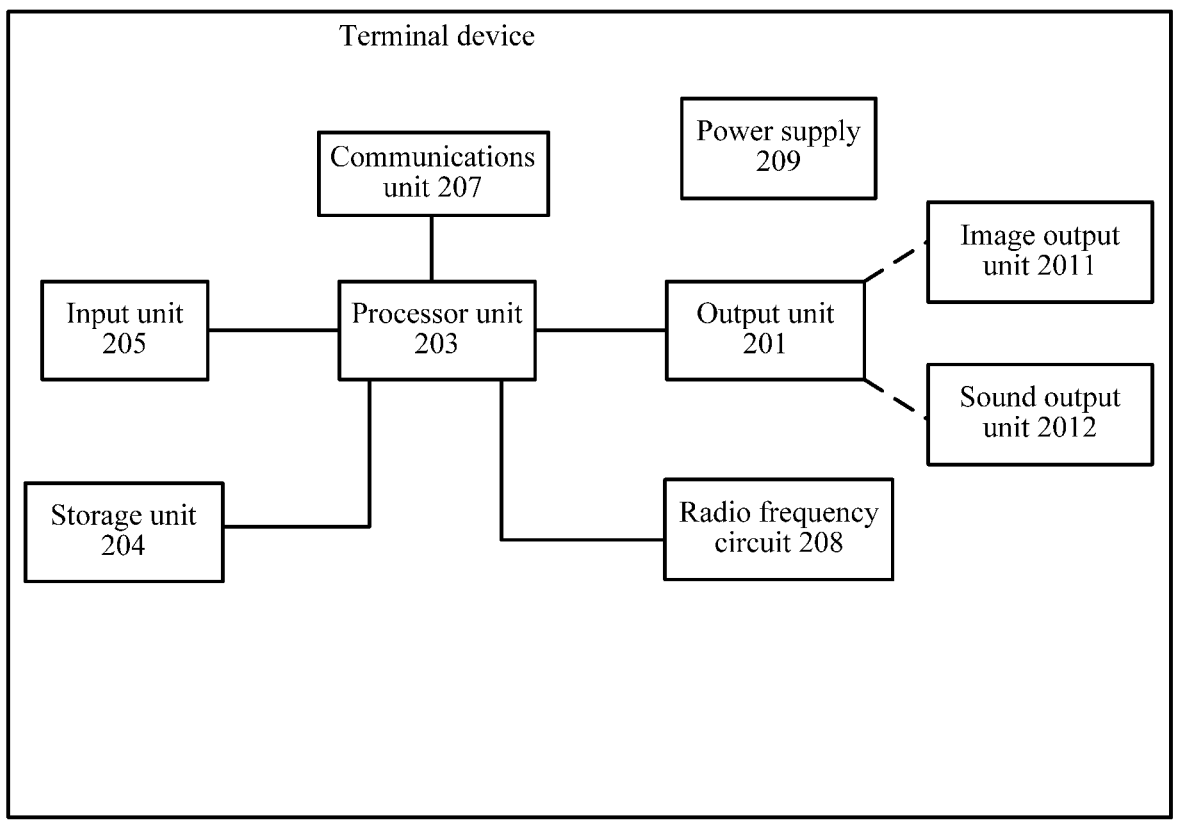
FIG. 2 is a schematic diagram of an embodiment of a terminal device according to an embodiment of the present disclosure.

The following describes a specific structure of the terminal device included in the communications system with reference to FIG. 2. FIG. 2 is a schematic structural diagram of an embodiment of a terminal device according to an embodiment of the present disclosure.

The terminal device includes components such as an input unit 205, a processor unit 203, an output unit 201, a communications unit 207, a storage unit 204, and a radio frequency circuit 208.

These components perform communication through one or more buses. Persons skilled in the art may understand that the structure of the terminal device shown in FIG. 2 does not constitute a limitation to the embodiments of the present disclosure, the terminal device may be of a bus structure or a star structure, and the terminal device may include more or fewer components than those shown in the figure, or some components may be combined, or a different component deployment may be used.

In an implementation of the present disclosure, the terminal device may be any mobile or portable electronic device, including, but not limited to, a smartphone, a mobile computer, a tablet computer, a personal digital assistant (PDA), a media player, a smart television, or the like.

The terminal device includes: output unit 201, configured to output a to-be-displayed image.

Specifically, the output unit 201 includes, but is not limited to, an image output unit 2011 and a sound output unit 2012.

The image output unit 2011 is configured to output text, pictures, and/or videos. The image output unit 2011 may include a display panel, for example, a display panel configured in a form of a liquid crystal display (LCD), an organic light-emitting diode (OLED), a field emission display (FED), or the like. Alternatively, the image output unit 2011 may include a reflective display, for example, an electrophoretic display, or a display using interferometric modulation of light.

The image output unit 2011 may include a single display or a plurality of displays having different sizes. In a specific implementation of the present disclosure, a touchscreen may also be used as a display panel of the output unit 201.

For example, after detecting a touch gesture operation or an approaching gesture operation on the touchscreen, the touchscreen transfers the touch gesture operation or the approaching gesture operation to the processor unit 203, to determine a type of a touch event. Subsequently, the processor unit 203 provides a corresponding visual output on the display panel according to the type of the touch event. Although in FIG. 2, the input unit 205 and the output unit 201 are used as two separate parts to implement input and output functions of the terminal device, but in some embodiments, the touchscreen and the display panel may be integrated to implement the input and output functions of the terminal device. For example, the image output unit 2011 may display various graphical user interfaces (GUI) to serve as a virtual control component, including, but not limited to, a window, a scroll bar, an icon, and a scrapbook, for a user to perform an operation through touching.

In a specific implementation of the present disclosure, the image output unit 2011 includes a filter and an amplifier, which are configured to filter and amplify a video output by the processor unit 203. The sound output unit 2012 includes a digital-to-analog converter, configured to convert an audio signal output by the processor unit 203 from a digital format into an analog format.

The processor unit 203 is configured to run corresponding code, and process received information, to generate and output a corresponding interface.

Specifically, the processor unit 203 is a control center of the terminal device, and connects to various parts of the entire terminal device by using various interfaces and lines. By running or executing a software program and/or module stored in a storage unit, and invoking data stored in the storage unit, the processor unit 203 performs various functions and data processing of the terminal device. The processor unit 203 may include an integrated circuit (IC), for example, may include a single encapsulated IC, or may include a plurality of encapsulated ICs having a same function or different functions.

For example, the processor unit 203 may only include a central processing unit (CPU), or may be a graphics processing unit (GPU), a digital signal processor (DSP), and a combination of control chips (for example, baseband chips) in a communications unit. In this implementation of the present disclosure, the CPU may include a single operation core, or may include a plurality of operation cores.

The storage unit 204 is configured to store code and data. The code is run by the processor unit 203.

Specifically, the storage unit 204 may be configured to store a software program and module. The processor unit 203 executes various functional applications and performs data processing of the terminal device by running the software program and module stored in the storage unit 204. The storage unit 204 may mainly include a program storage area and a data storage area. The program storage area may store an operating system and an application program required by at least one function, such as a sound play program or an image display program. The data storage area may store data (such as audio data and a phone book) created according to use of the terminal device, and the like.

In a specific implementation of the present disclosure, the storage unit 204 may include a volatile memory, for example, a non-volatile dynamic random access memory (NVRAM), a phase change random access memory (PRAM), or a magneto-resistive random access memory (MRAM), and may further include a non-volatile memory, for example, at least one magnetic disk storage, an electrically erasable programmable read-only memory (EEPROM), and a flash memory such as a NOR flash memory or a NAND flash memory.

The non-volatile memory stores an operating system and an application program that are executed by the processor unit 203. The processor unit 203 loads a running program and data to a memory from the non-volatile memory and stores digital content in a mass storage apparatus. The operating system includes various components and/or drives configured to control and manage a general system task, for example, memory management, storage device control, and power management and help communication between various software and hardware.

In an implementation of the present disclosure, the operating system may be an Android system developed by the Google company, an iOS system developed by the Apple company, a Windows operating system developed by the Microsoft company, or the like, or may be an embedded operating system such as Vxworks.

The application program includes any application installed on the terminal device, including, but not limited to, a browser, an email, an instant messaging message service, text processing, keyboard virtualization, a widget, encryption, digital rights management, speech recognition, speech reProductionion, positioning (for example, a function provided by the Global Positioning System), music play, and the like.

The input unit 205 is configured to implement interaction between a user and the terminal device and/or input information to the terminal device.

For example, the input unit 205 may receive digit or character information initiated by a user, to generate a signal input related to a user setting or a function. In a specific implementation of the present disclosure, the input unit 205 may be a touchscreen, or may be another human computer interaction interface, for example, a physical input key or a microphone, or may be another external information obtaining apparatus, for example, a camera.

The touchscreen shown in this embodiment of the present disclosure may collect a touch or an approaching operation action of a user on the touchscreen, for example, an operation action performed by a user on or near touchscreen by using any suitable object such as a finger or a stylus, and drive a corresponding connected apparatus according to a preset program. In some embodiments, the touchscreen may include two parts: a touch detection apparatus and a touch controller. The touch detection apparatus detects a touch operation of a user, converts the detected touch operation into an electrical signal, and sends the electrical signal to the touch controller. The touch controller receives the electrical signal from the touch detection apparatus, converts the electrical signal into touch point coordinates, and then sends the touch point coordinates to the processor unit 203.

The touch controller may further receive and execute a command sent by the processor unit 203. In addition, the touchscreen may be implemented by using various types, such as a resistive type, a capacitive type, an infrared type, and a surface acoustic wave type.

In other implementations of the present disclosure, the physical input key used by the input unit 205 may include, but is not limited to, one or more of a physical keyboard, a functional key (such as a volume control key or a switch key), a track ball, a mouse, a joystick, and the like. The input unit 205 in a form of a microphone may collect voice input by a user or an environment, and convert the voice into a command that is in a form of an electrical signal and that can be executed by the processor unit 203.

In some embodiments of the present disclosure, the input unit 205 may alternatively be various types of sensor devices, for example, a Hall device, configured to: detect a physical quantity of the terminal device, for example, force, torque, pressure, stress, a location, displacement, a speed, acceleration, an angle, an angular velocity, revolutions, a rotational speed, or a time at which a work status changes, and convert the physical quantity into an electricity quantity for detection and control. Some other sensor devices may further include a gravity sensor, a tri-axis accelerometer, a gyroscope, an electronic compass, an ambient light sensor, a proximity sensor, a temperature sensor, a humidity sensor, a pressure sensor, a heart rate sensor, a fingerprint sensor, and the like.

The communications unit 207 is configured to establish a communications channel, to enable the terminal device to connect to a remote server through the communications channel, and download media data from the remote server. The communications unit 207 may include a communications module such as a wireless local area network (wireless LAN) module, a Bluetooth module, or a baseband module, and a radio frequency (RF) circuit corresponding to the communications module, configured to perform wireless local area network communication, Bluetooth communication, infrared communication, and/or communication by using a cellular communications system, for example, Wideband Code Division Multiple Access (W-CDMA) and/or High Speed Downlink Packet Access (HSDPA). The communications module is configured to control communication of each component in the terminal device, and may support direct memory access.

In some embodiments of the present disclosure, various communications modules in the communications unit 207 generally appear in forms of integrated circuit chips, may be selectively combined, and does not need to include all communications modules and corresponding antenna groups. For example, the communications unit 207 may include only a baseband chip, a radio frequency chip, and a corresponding antenna, to provide a communication function in a cellular communications system. The terminal device may connect to a cellular network or the Internet through a wireless communication connection established by the communications unit 207, for example, through wireless local area network access or WCDMA. In some optional implementations of the present disclosure, the communications module in the communications unit 207, for example, the baseband module, may be integrated into the processor unit 203, typically, for example, APQ+MDM series of platforms provided by the Qualcomm company.

The radio frequency circuit 208 is configured to receive and send information, or receive and send a signal during a call. For example, after receiving downlink information of a base station, the radio frequency circuit 208 sends the downlink information to the processor unit 203 for processing; and in addition, sends design uplink data to the base station. Usually, the radio frequency circuit 208 includes a known circuit configured to perform these functions, including, but not limited to, an antenna system, a radio frequency transceiver, one or more amplifiers, a tuner, one or more oscillators, a digital signal processor, a codec chip group, a subscriber identity module (SIM) card, a memory, or the like. In addition, the radio frequency circuit 208 may also communicate with a network and another device through wireless communication.

The wireless communication may use any communication standard or protocol, including, but not limited to, a Global System for Mobile Communications (GSM), a general packet radio service (GPRS), Code Division Multiple Access (CDMA), Wideband Code Division Multiple Access (WCDMA), high speed uplink packet access (HSUPA), Long Term Evolution (LTE), an email, a short messaging service (SMS), and the like.

The power supply 209 is configured to supply power to different parts of the terminal device to maintain operation of the terminal device. As a general understanding, the power supply 209 may be a built-in battery, for example, a common lithium-ion battery or NiMH battery, or may be an external power supply directly supplying power to the terminal device, for example, an AC adapter. In some implementations of the present disclosure, the power supply 209 may have a wider definition, for example, may further include a power management system, a charging system, a power failure detection circuit, a power converter or inverter, a power status indicator (for example, a light-emitting diode), and any component related to electric energy generation, management, and distribution of the terminal device.

The processor unit 203 is connected to the storage unit 204 by using the bus system.

The one or more programs are stored in the storage unit 204, the one or more programs include instructions, and the instructions cause, when executed by the terminal device, the terminal device to perform the data response method shown in this embodiment.

Figure 3:
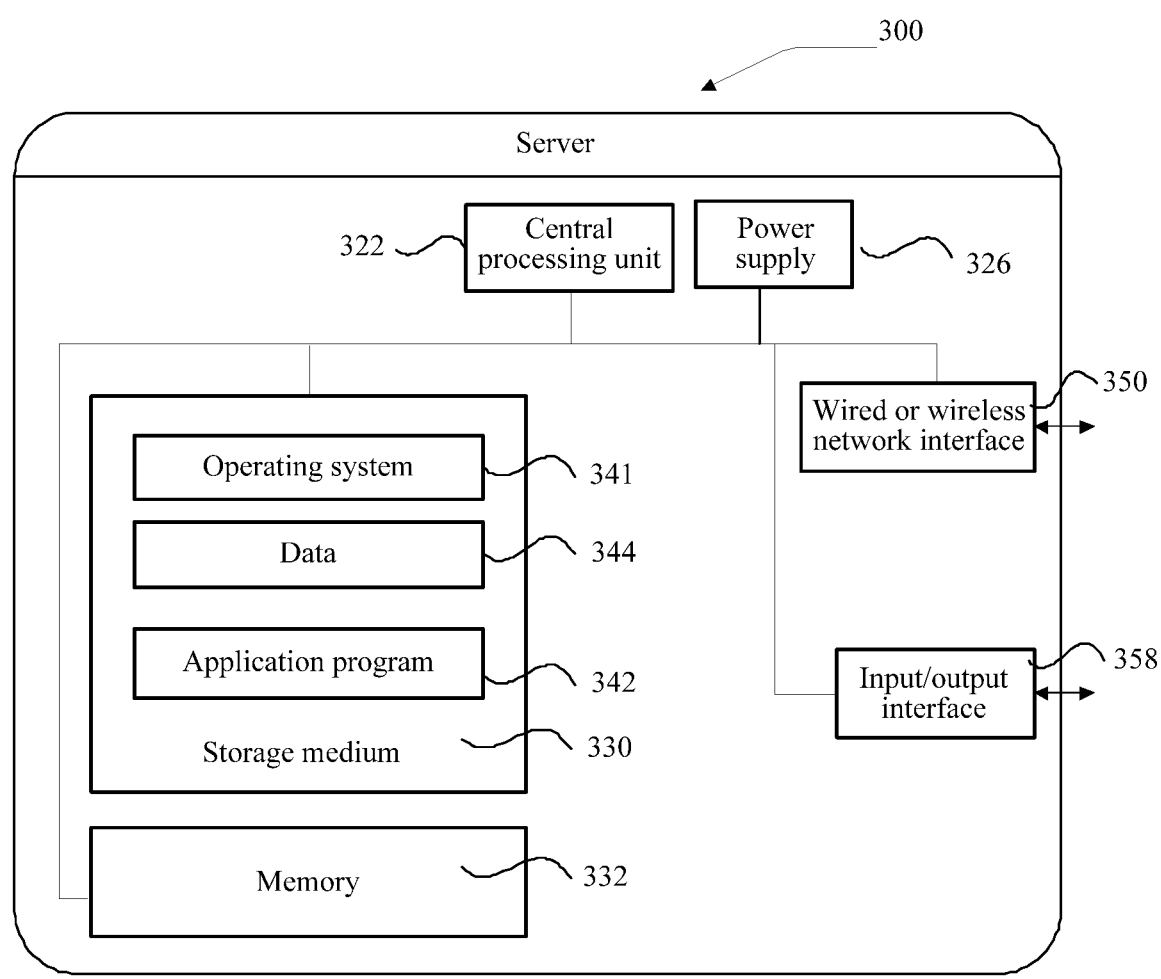
FIG. 3 is a schematic diagram of an embodiment of a server according to an embodiment of the present disclosure.

The following describes, with reference to FIG. 3, an embodiment of the server included in the communications system.

FIG. 3 is a schematic structural diagram of a server according to an embodiment of the present disclosure. The server 300 may vary greatly due different configurations or performance, and may include one or more central processing units (CPU) 322 (for example, one or more processors) and memories 332, and one or more storage media 330 (for example, one or more mass storage devices) storing an application program 342 or data 344. The memory 332 and the storage medium 330 may be transient storages or persistent storages. The program stored in the storage medium 330 may include one or more modules (not shown), and each module may include a series of instructions and operations for the server. Furthermore, the central processing unit 322 may be set to communicate with the storage medium 330, and execute, on the server 300, a series of instructions and operations in the storage medium 330.

The server 300 may further include one or more power supplies 326, one or more wired or wireless network interfaces 350, one or more input/output interfaces 358, and/or one or more operating systems 341, for example, Windows Server™, Mac OS X™, Unix™, Linux™, and FreeBSD™.

The central processing unit 322 and the memory 332 shown in this embodiment are connected by using the bus system.

The one or more programs are stored in the memory 332, the one or more programs include instructions, and the instructions cause, when executed by the server, the server to perform the data response method shown in this embodiment.

This embodiment further provides a computer-readable storage medium storing one or more programs. The computer-readable storage medium includes one or more programs, the one or more programs include instructions, and the instructions cause, when executed by a server, the server to perform the data response method shown in this embodiment.

Figure 4:
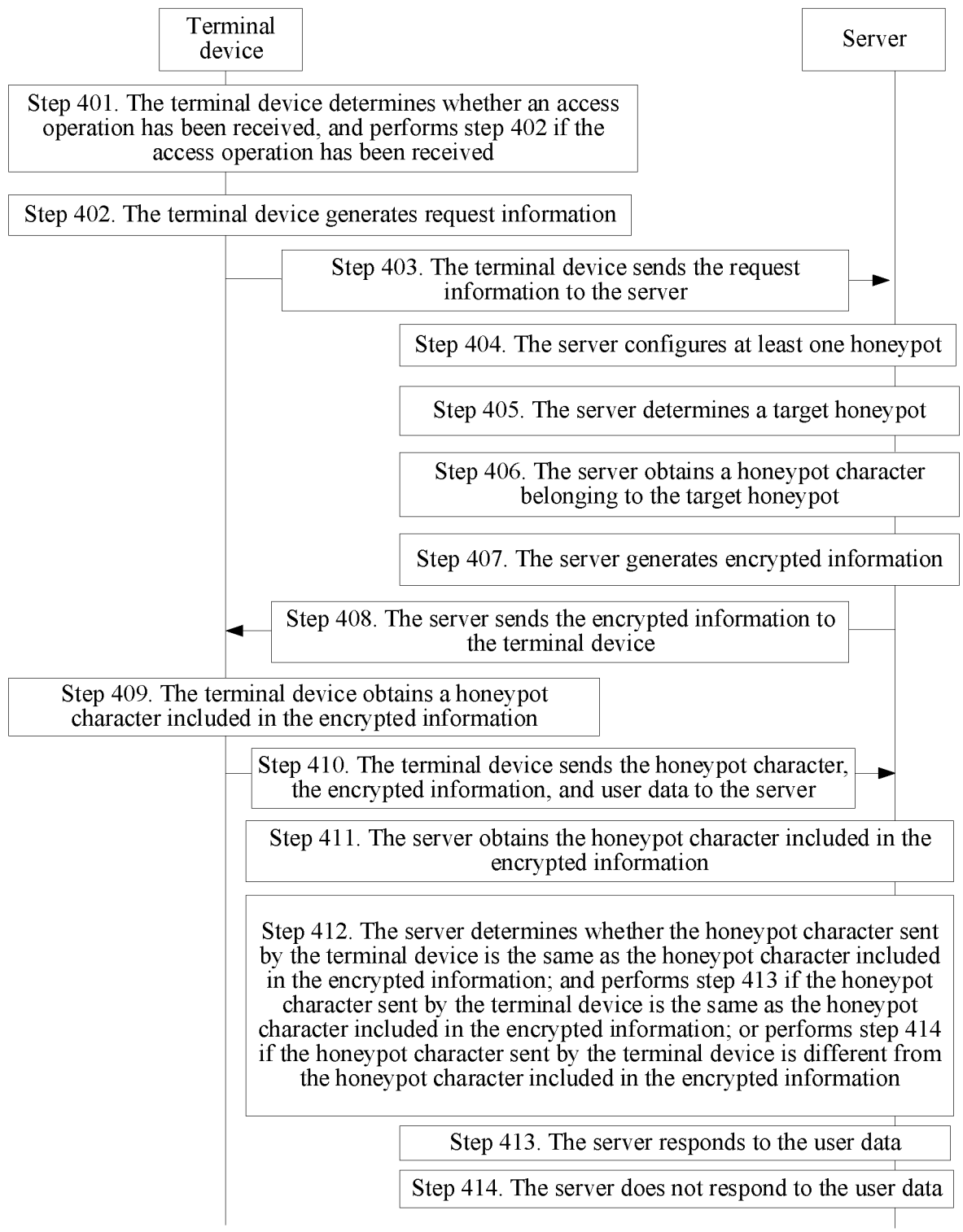
FIG. 4 is a flowchart of steps of an embodiment of a data response method according to an embodiment of the present disclosure.

The following describes in detail, with reference to FIG. 4, a performing process of the data response method provided in this embodiment.

Step 401. The terminal device determines whether an access operation has been received, and performs step 402 if the access operation has been received.

Specifically, the terminal device shown in this embodiment determines whether a front-end interface of the terminal device has received the access operation.

The terminal device shown in this embodiment may be provided with a protected front-end interface, and the protected front-end interface shown in this embodiment is an interface configured to authenticate data. Even if the protected front-end interface is stolen, an attacker cannot obtain an interface of privacy data of a user.

In some embodiments, the type of the front-end interface shown in this example may be a global wide area network web front end, a mobile phone software APP, a personal computer PC client, or the like.

A specific type of the front-end interface is not limited in this embodiment, provided that the front-end interface can detect whether a user initiates an access operation.

Step 402. The terminal device generates request information.

A specific type of and specific content included in the request information are not limited in this embodiment, provided that the request information can request the server for encrypted information.

Step 403. The terminal device sends the request information to the server.

After receiving the request information, the server shown in this embodiment may send the encrypted information to the terminal device. A specific sending process may include the following steps.

Step 404. The server configures at least one honeypot.

The server shown in this embodiment can configure the at least one honeypot after receiving the request information.

Specifically, the server shown in this embodiment configures the at least one honeypot based on a honeypot technology.

The honeypot technology shown in this embodiment is a behavior that attracts an attacker or malicious code to invade by appearing to be a valuable and defective service, to analyze a behavior motivation and technical details of the attacker or malicious code for defense.

The honeypot is a secure resource set by a network administrator on a server, the value of the honeypot is to be detected, attacked, and damaged, thereby collecting evidence and hiding a real server address, and the honeypot can have a capability of discovering attacks, generating warnings, a powerful recording capability, a deception capability, and a capability of assisting investigation.

The following describes advantages of the honeypot.

Although a honeypot has little direct contribution to protection, that is, the honeypot does not reject an intruder who is attempting to attack, the honeypot does not reject an intruder out of a system because the original intent of the honeypot design is a compromise, and in fact, the honeypot expects intrusion into the system for recording and analyzing works. Although the direct safeguard function of the honeypot is very weak, but it has a very strong detection function. For many organizations, it is very difficult to detect a suspicious behaviors from a large quantity of system logs. Although there are intrusion detection systems (IDS), false positives and false negatives of the IDS make system administrators tired of dealing with various warnings and false positives. The function of honeypot is that its false positive rate is much lower than that of most IDS tools. It is also important to notice update of a feature database and modification of a detection engine. Because the honeypot does not have any effective behavior, in principle, any connection to the honeypot should be one of listening, scanning, and attacking. Therefore, the false positive rate and a false negative rate can be greatly reduced, thereby simplifying a detection process. If the system in the server has been intruded, those systems that have accidents cannot work offline, which would cause all services provided by the systems to be stopped. In addition, the system administrator cannot perform appropriate authentication and analysis. The honeypot can respond to the intrusion, which provides a system with low data pollution and this ready to be sacrificed system can work offline at any time. In this case, the system administrator will be able to analyze the offline system and apply analysis results and experience to all systems.

Specifically, the most important function of the honeypot is to monitor and record all operations and behaviors in the server, so that the attacker does not know that all behaviors are already under supervision of the server after entering the server system.

The following describes several types of honeypots.

Honeypots are classified into Production honeypots and research honeypots.

Production honeypots are generally used in networks of commercial organizations. The production honeypots aim to alleviate the threat of attacks that the organizations will be exposed to, and the honeypots strengthen security measures of the protected organizations. The work of such honeypots is to detect and deal with malicious attackers. Production honeypots are placed inside the production network with other production servers by an organization to improve their overall state of security. Normally, production honeypots are low-interaction honeypots, which are easier to deploy. They give less information about the attacks or attackers than research honeypots.

Research honeypots are specifically designed for the purpose of researching and obtaining attack information. Such honeypots do not enhance the security of specific organizations. On the contrary, the honeypots need to make research organizations face various types of network threats and find better ways to deal with them. The work of the honeypots is to collect information about malicious attackers. It is generally used in military and security research organizations.

According to interaction between honeypots and attackers, the honeypots can be classified into three categories: low-interaction honeypots, medium-interaction honeypots, and high-interaction honeypots.

The most prominent feature of the low-interaction honeypots is simulation. All attack vulnerabilities and attack objects that a honeypot shows to an attacker are not real production systems, but are simulations of various systems and services provided by the systems. Because its services are simulated behaviors, the honeypot can obtain only very limited information and can only respond to attackers simply. The low-interaction honeypot is the most secure type of honeypots.

The medium-interaction honeypot is a simulation of various behaviors of a real operating system, which provides more interactive information and can also obtain more information from a behavior of an attacker. In a behavior simulation system, honeypots may look the same as real operating systems. They are more attractive targets than real systems.

The high-interaction honeypot has a real operating system, and its advantages are embodied in providing a real system to an attacker. When the attacker obtains a ROOT authority, confused by the system and data, more activities and behaviors of the attacker will be recorded. A disadvantage is that the possibility of being intruded is very high. If the entire high-interaction honeypot is intruded, it will become a springboard for the next attack by the attacker.

Specifically, a quantity of honeypots and types of the honeypots are not limited in this embodiment.

Step 405. The server determines a target honeypot.

Specifically, the server determines one honeypot in the at least one honeypot as the target honeypot.

In some embodiments, the server may arbitrarily determine one honeypot in the at least one honeypot as the target honeypot.

Further, in some embodiments, the server may determine the target honeypot in the at least one honeypot according to a service type.

Specifically, the server shown in this embodiment can obtain an application service that is to be simulated, that is, the server sets up a honeypot by using the application service.

For example, the server may create a honeypot by using a user identity authentication service, so that the created honeypot can perform user identity authentication.

For another example, the server may create a honeypot by using an Internet banking transaction service, so that the created honeypot can perform an Internet banking transaction.

In this embodiment, the honeypot created by the server opens a known controllable security vulnerability of at least one application service, that is, and the server can control the opened security vulnerability of the created honeypot. Therefore, an attacker can attack the honeypot.

The server shown in this embodiment may obtain a service type required by the terminal device, and a type of an application service that the target honeypot determined by the server in the at least one honeypot can provide matches the service type required by the terminal device.

Step 406. The server obtains a honeypot character belonging to the target honeypot. In the present disclosure, a honeypot character is used to refer to any data field, token, or any other type of data that is a part of a honeypot.

In this embodiment, in a process in which the server creates the honeypot, the honeypot character may be set in the honeypot.

A type and a length of the honeypot character are not limited in this embodiment.

For example, the honeypot character is a combination of any one or two of the following: a letter, a number, a word, and a symbol.

The honeypot character shown in this embodiment may be 02X, acdt, or the like. This is not specifically limited in this embodiment.

In some embodiments, in this embodiment, in the process in which the server configures the honeypot, different honeypot characters may be set in different honeypots.

Further, in some embodiments, in the process in which the server configures the honeypot, different honeypot characters may be set in at least two different honeypots.

Step 407. The server generates encrypted information.

Specifically, the server shown in this embodiment performs encryption computation on the honeypot character belonging to the target honeypot, to generate the encrypted information.

The encryption algorithm shown in this embodiment may be any one of the following: a data encryption standard DES, a DES-based symmetric algorithm 3DES, a digital signature algorithm DSA, an RSA encryption algorithm, an advanced encryption standard AES, and the like.

It should be noted that the description of the encryption algorithm in this embodiment is an optional example, and is not limited, provided that the server can perform, based on the encryption algorithm, encryption computation on the honeypot character belonging to the target honeypot to generate the encrypted information and that the encrypted information can be decrypted.

Step 408. The server sends the encrypted information to the terminal device.

In this embodiment, after generating the encrypted information, the server may send the encrypted information to the terminal device.

It should be clarified that in this embodiment, an example description is given by using an example in which step 403 is performed first and then step 404 to step 408 are performed, that is, the example description is given by using an example in which the server first receives the request information sent by the terminal device, and then configures the encrypted information according to the request information.

In another embodiment, alternatively, the server may pre-configure the encrypted information, and can send the configured encrypted information to the terminal device after the server receives the request information sent by the terminal device.

Step 409. The terminal device obtains a honeypot character included in the encrypted information.

Specifically, the terminal device may obtain the encrypted information sent by the server.

For a specific description of the encrypted information, refer to the foregoing embodiment, and details are not described in this embodiment again.

The terminal device may perform decryption computation on the encrypted information, to obtain the honeypot character included in the encrypted information.

The terminal device may perform decryption computation on the encrypted information based on a decryption algorithm, to obtain the honeypot character included in the encrypted information.

The decryption algorithm is not limited in this embodiment, provided that decryption computation can be performed on the encrypted information.

In some embodiments, in this embodiment, the decryption algorithm can be agreed between the server and the terminal device in advance, so that the terminal device can perform decryption computation on the encrypted information based on the agreed decryption algorithm.

Further, In some embodiments, the terminal device can pre-store a correspondence list. The correspondence list includes correspondences between different decryption algorithms and different identifiers. The server may send a target identifier to the terminal device. The terminal device may determine, according to the correspondence list, a target decryption algorithm corresponding to the target identifier, and the terminal device may perform decryption computation on the encrypted information based on the target decryption algorithm.

Further, in some embodiments, the terminal device may analyze the encrypted information, to obtain a decryption algorithm by using which decryption computation can be performed on the encrypted information.

Step 410. The terminal device sends the honeypot character, the encrypted information, and user data to the server.

In this embodiment, a front end of the terminal device may collect the user data. The user data is not limited in this embodiment. For example, the user data may be data related to an access operation of a user for accessing a front-end interface. For another example, the user data may be related data that the front-end interface may generate in response to the access operation. For still another example, the user data may be data that a user fills in according to a requirement, and the like.

The honeypot character shown in this embodiment is obtained by the terminal device by performing decryption computation on the encrypted information, that is, the honeypot character is included in the encrypted information.

As can be seen, the terminal device shown in this embodiment may send the obtained encrypted information, honeypot character, and user data to the server.

Step 411. The server obtains the honeypot character included in the encrypted information.

Specifically, the server shown in this embodiment may perform decryption computation on the encrypted information, to obtain the honeypot character included in the encrypted information.

More specifically, the server shown in this embodiment may perform decryption computation on the encrypted information based on a decryption algorithm, to obtain the honeypot character included in the encrypted information.

The decryption algorithm is not limited in this embodiment, provided that the server can perform decryption computation on the encrypted information based on the decryption algorithm, to obtain the honeypot character included in the encrypted information.

In some embodiments, the decryption algorithm shown in this embodiment may be a decryption algorithm agreed between the server and the terminal device in advance.

Step 412. The server determines whether the honeypot character sent by the terminal device is the same as the honeypot character included in the encrypted information; and performs step 413 if the honeypot character sent by the terminal device is the same as the honeypot character included in the encrypted information; or performs step 414 if the honeypot character sent by the terminal device is different from the honeypot character included in the encrypted information.

Specifically, the server shown in this embodiment may determine whether the honeypot character sent by the terminal device is the same as the honeypot character included in the encrypted information.

More specifically, in this embodiment, the server sends the encrypted information to the terminal device, to authenticate whether the terminal device has tampered with data. If the terminal device has tampered with the data, it indicates that the honeypot character sent by the terminal device is different from the honeypot character included in the encrypted information.

If the terminal device has not tampered with the data, it indicates that the honeypot character sent by the terminal device is the same as the honeypot character included in the encrypted information.

Step 413. The server responds to the user data.

In this embodiment, if the server determines that the honeypot character sent by the terminal device is the same as the honeypot character included in the encrypted information, it indicates that the terminal device has not tampered with the data, and the server may respond to the user data.

For example, if the user data includes a user name and a password that are required when a user logs in to a personal computer PC client, the server may respond to the user data, and determine whether the user name and the password that are included in the user data have been stored on the server. If the user name and the password that are included in the user data have been stored on the server, the server may allow the user to log in to the personal computer PC client.

The description of the specific manner in which the server responds to the user data in this embodiment is an optional example rather than a limitation.

Step 414. The server does not respond to the user data.

In this embodiment, if the server determines that the honeypot character sent by the terminal device is different from the honeypot character included in the encrypted information, it indicates that the terminal device has tampered with the data, the honeypot field is therefore changed, and the server skips responding to the user data.

Accordingly, by using the data response method, the terminal device, and the server that are in the present disclosure, because encrypted information cannot be tampered with, by using the encrypted information, the system can check whether a honeypot character sent by the terminal device is consistent with a honeypot character included in the encrypted information. Such a process does not need to consume large amount of storage space of the server, thereby improves the operation efficiency of the server. In addition, operations of the method shown in the embodiments is simple, thereby improving efficiency of the systems. Moreover, in the embodiments of the present disclosure, the system can detect a tampering operation of the terminal device on data before a loss is caused, so that countermeasures can be taken in advance, thereby effectively avoiding breaching of user privacy data. As such, integrality of front-end data of the terminal device can be actively protected, security of a communications system is effectively ensured, and a loss of the communications system is avoided.

Figure 5:
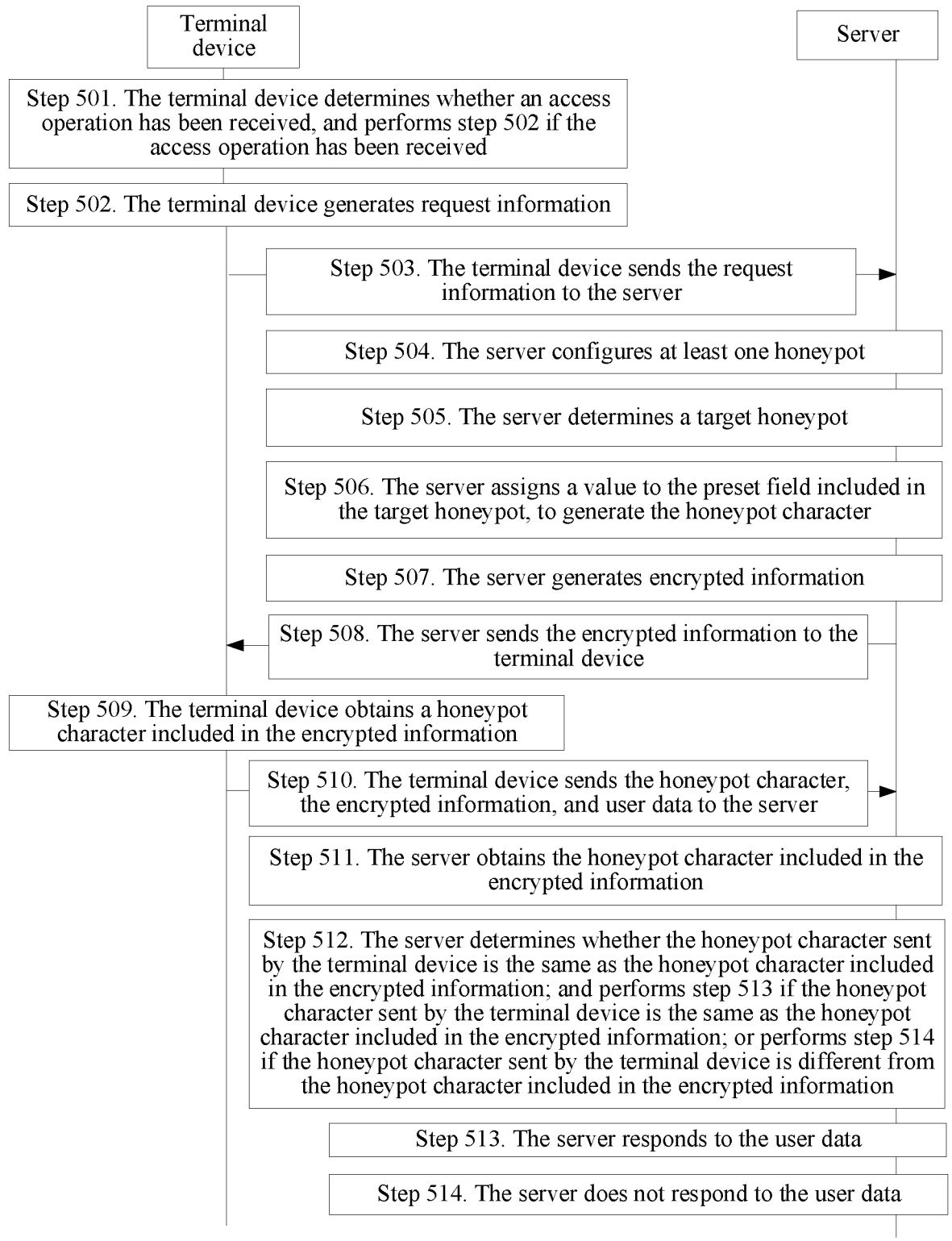
FIG. 5 is a flowchart of steps of another embodiment of a data response method according to an embodiment of the present disclosure.

The following describes in detail, with reference to FIG. 5, another embodiment of the data response method shown in this embodiment.

Step 501. The terminal device determines whether an access operation has been received, and performs step 502 if the access operation has been received.

Step 502. The terminal device generates request information.

Step 503. The terminal device sends the request information to the server.

For specific performing processes of step 501 and step 502 shown in this embodiment, refer to step 401 and step 402 shown in the foregoing embodiment, and details are not described in this embodiment again.

Step 504. The server configures at least one honeypot.

The server shown in this embodiment can configure the at least one honeypot after receiving the request information.

Specifically, the server shown in this embodiment configures the at least one honeypot based on a honeypot technology.

For specific descriptions of the honeypot technology and a honeypot type, refer to the foregoing embodiment, and details are not described in this embodiment again.

In this embodiment, a preset field is set for the server in the provided honeypot.

The preset field shown in this embodiment may be a token, a key, a client type, or the like. The description of the preset field in this embodiment is an optional example rather than a limitation, provided that a value can be assigned to the preset field.

Step 505. The server determines a target honeypot.

For details about a specific performing process of step 505 shown in this embodiment, refer to that of step 405 shown in FIG. 4. The specific performing process is not described in detail in this embodiment.

Step 506. The server assigns a value to the preset field included in the target honeypot, to generate the honeypot character.

Specifically, in this embodiment, a specific process of obtaining, by the server, the honeypot character belonging to the target honeypot may be:

assigning, by the server, the value to the preset field included in the target honeypot, to generate the honeypot character.

Specifically, the server shown in this embodiment may dynamically assign a value to the preset field included in the target honeypot, to generate the honeypot character.

In some embodiments, the server shown in this embodiment may randomly assign a value to the preset field included in the target honeypot.

In this embodiment, the server may assign a value to a preset field located in the target honeypot, to complete value assignment to the preset field.

A specific value and value length assigned to the preset field are not limited in this embodiment, provided that the value can be assigned to the preset field located in the target honeypot.

Step 507. The server generates encrypted information.

Step 508. The server sends the encrypted information to the terminal device.

Step 509. The terminal device obtains a honeypot character included in the encrypted information.

Step 510. The terminal device sends the honeypot character, the encrypted information, and user data to the server.

Step 511. The server obtains the honeypot character included in the encrypted information.

For details about specific performing processes of step 507 to step 511 shown in this embodiment, refer to the specific performing processes of step 407 to step 411 shown in FIG. 4. This is not specifically limited in this embodiment.

Step 512. The server determines whether the honeypot character sent by the terminal device is the same as the honeypot character included in the encrypted information; and performs step 513 if the honeypot character sent by the terminal device is the same as the honeypot character included in the encrypted information; or performs step 514 if the honeypot character sent by the terminal device is different from the honeypot character included in the encrypted information.

Specifically, the server shown in this embodiment may determine whether the honeypot character sent by the terminal device is the same as the honeypot character included in the encrypted information.

More specifically, the server shown in this embodiment may determine whether a value of the honeypot character sent by the terminal device is the same as a value of the honeypot character included in the encrypted information.

In this embodiment, the server sends the encrypted information to the terminal device, to authenticate whether the terminal device has tampered with data. If the terminal device has tampered with the data, it indicates that the honeypot character sent by the terminal device is different from the honeypot character included in the encrypted information.

If the terminal device has not tampered with the data, it indicates that the honeypot character sent by the terminal device is the same as the honeypot character included in the encrypted information.

Step 513. The server responds to the user data.

In this embodiment, if the server determines that the honeypot character sent by the terminal device is the same as the honeypot character included in the encrypted information, it indicates that the terminal device has not tampered with the data, and the server may respond to the user data.

For example, if the user data includes a user name and a password that are required when a user logs in to a personal computer PC client, the server may respond to the user data, and determine whether the user name and the password that are included in the user data have been stored on the server. If the user name and the password that are included in the user data have been stored on the server, the server may allow the user to log in to the personal computer PC client.

The description of the specific manner in which the server responds to the user data in this embodiment is an optional example rather than a limitation.

Step 514. The server does not respond to the user data.

In this embodiment, if the server determines that the honeypot character sent by the terminal device is different from the honeypot character included in the encrypted information, it indicates that the terminal device has tampered with the data, the honeypot field is therefore changed, and the server skips responding to the user data.

By using the data response method, the terminal device, and the server that are in the present disclosure, because encrypted information cannot be tampered with, by using the encrypted information, the system can check whether a honeypot character sent by the terminal device is consistent with a honeypot character included in the encrypted information. Such a process does not need to consume large amount of storage space of the server, thereby improves the operation efficiency of the server. In addition, operations of the method shown in the embodiments is simple, thereby improving efficiency of the systems. Moreover, in the embodiments of the present disclosure, the system can detect a tampering operation of the terminal device on data before a loss is caused, so that countermeasures can be taken in advance, thereby effectively avoiding breaching of user privacy data. As such, integrality of front-end data of the terminal device can be actively protected, security of a communications system is effectively ensured, and a loss of the communications system is avoided.

Moreover, by using the method shown in this embodiment, a value can be dynamically assigned to the preset field located in the target honeypot, to generate the honeypot character. As can be seen, in this embodiment, the honeypot character can be dynamically adjusted, thereby improving a capability of the server of perceiving whether the terminal device has tampered with data.

Figure 6:
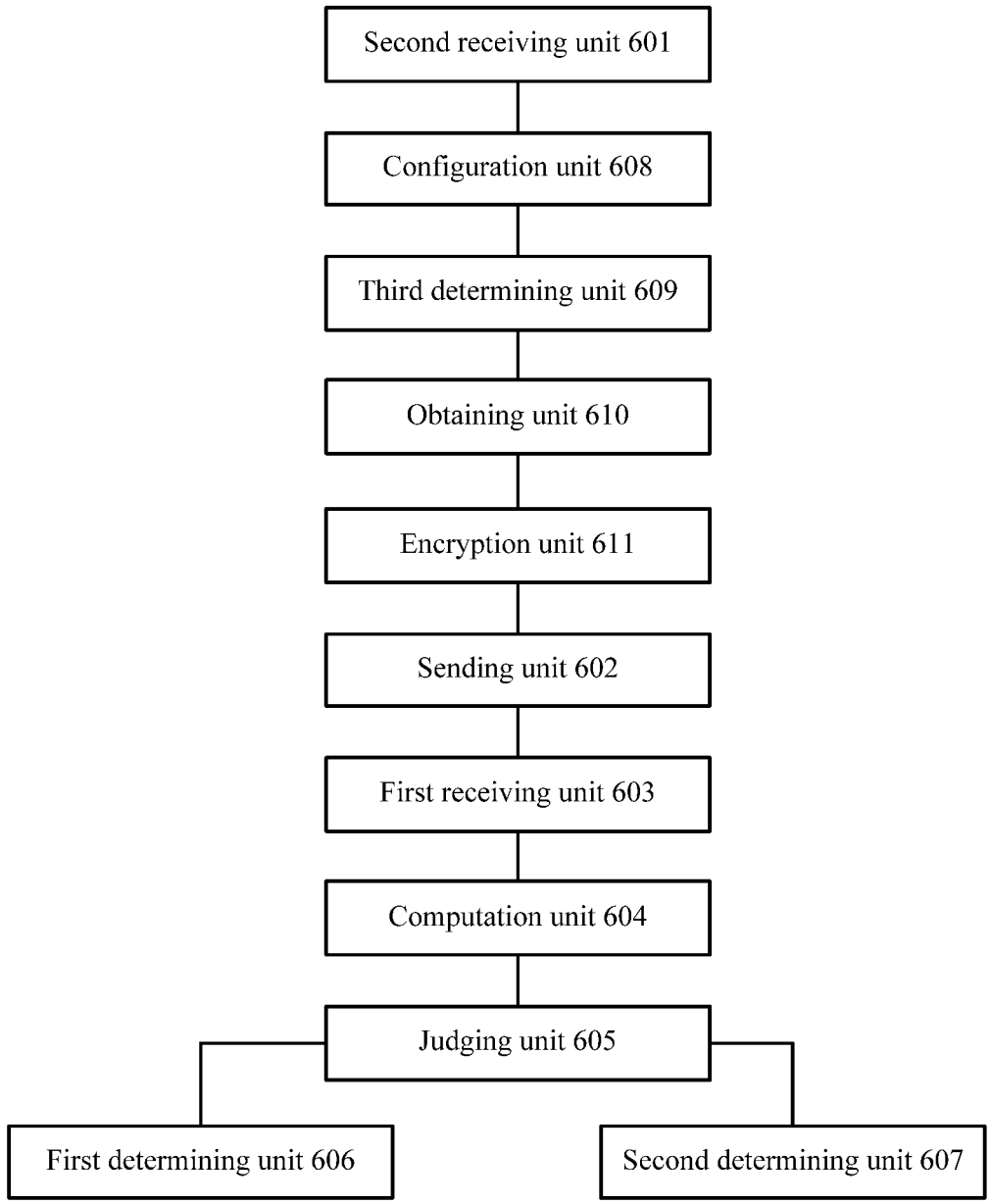
FIG. 6 is a schematic architectural diagram of another embodiment of a server according to an embodiment of the present disclosure.

In the foregoing embodiment, the specific architecture of the server is described in terms of physical hardware. The following describes the specific structure of the server in terms of functional modules in detail with reference to FIG. 6.

The server includes: a first receiving unit 603, configured to receive a honeypot character, encrypted information, and user data that are sent by a terminal device, the encrypted information being information sent to the terminal device; a computation unit 604, configured to perform decryption computation on the encrypted information, to obtain the honeypot character included in the encrypted information; a judging unit 605, configured to determine whether the honeypot character sent by the terminal device is the same as the honeypot character included in the encrypted information; and a first determining unit 606, configured to respond to the user data if it is determined that the honeypot character sent by the terminal device is the same as the honeypot character included in the encrypted information.

In some possible implementations, the server may further include: a second determining unit 607, configured to not responding to the user data if it is determined that the honeypot character sent by the terminal device is different from the honeypot character included in the encrypted information; a second receiving unit 601, configured to receive request information sent by the terminal device, where the request information is used to request the server for the encrypted information; a configuration unit 608, configured to configure at least one honeypot, where the honeypot includes a preset field; a third determining unit 609, configured to determine one honeypot in the at least one honeypot as the target honeypot; an obtaining unit 610, configured to obtain a honeypot character belonging to the target honeypot, where the target honeypot is one of at least one preconfigured honeypot, where the obtaining unit 610 may be specifically configured to assign a value to the preset field included in the target honeypot, to generate the honeypot character; an encryption unit 611, configured to perform encryption computation on the honeypot character, to generate the encrypted information; and a sending unit 602, configured to send the encrypted information to the terminal device according to the request information.

For details about a specific process in which the server shown in this embodiment performs the data response method, refer to the foregoing embodiment, and details are not described in this embodiment again.

Figure 7:
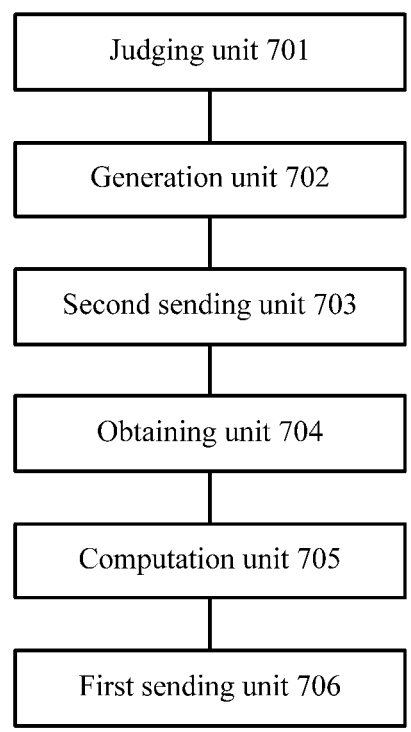
FIG. 7 is a schematic architectural diagram of another embodiment of a terminal device according to an embodiment of the present disclosure.

In the foregoing embodiment, the specific architecture of the terminal device is described in terms of physical hardware. The following describes the specific structure of the terminal device in terms of functional modules in detail with reference to FIG. 7.

The terminal device includes: an obtaining unit 704, configured to obtain encrypted information sent by a server; a computation unit 705, configured to perform decryption computation on the encrypted information, to obtain a honeypot character included in the encrypted information; and a first sending unit 706, configured to send the honeypot character, the encrypted information, and user data to the server, so that the server responds to the user data if the server determines that the honeypot character sent by the terminal device is the same as the honeypot character included in the encrypted information; or the server not responding to the user data if the server determines that the honeypot character sent by the terminal device is different from the honeypot character included in the encrypted information.

In some possible implementations, the terminal device may further include: a judging unit 701, configured to determine whether an access operation has been received; a generation unit 702, configured to generate request information if it is determined that the access operation has been received; and a second sending unit 703, configured to send the request information to the server, so that the server sends the encrypted information to the terminal device.

For details about a specific process in which the terminal device shown in this embodiment performs the data response method, refer to the foregoing embodiment, and details are not described in this embodiment again.

It may be clearly understood by persons skilled in the art that for convenience and brevity of description, for a detailed working process of the foregoing system, apparatus, and unit, reference may be made to a corresponding process in the foregoing method embodiments, and details are not described herein again.

In the several embodiments provided in the present disclosure, it should be understood that the disclosed system, apparatus, and method may be implemented in other manners. For example, the described apparatus embodiment is merely an example. For example, the unit division is merely logical function division and may be other division during actual implementation. For example, a plurality of units, modules, or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units or modules described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units or modules in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit or software function module, the integrated unit may be stored in a computer-readable storage medium. Based on such an understanding, the technical solutions of the present disclosure essentially, or the part contributing to the existing technology, or all or some of the technical solutions may be implemented in the form of a software product. The software product is stored in a storage medium and includes several instructions for instructing a computer device (which may be a personal computer, a server, or a network device) to perform all or some of the steps of the methods described in the functional units or functional modules of the embodiments of the present disclosure. The foregoing storage medium includes: any medium that can store program code, such as a USB flash memory drive, a removable hard disk, a read-only memory (ROM), a random access memory (RAM), a magnetic disk, or an optical disc.

The foregoing embodiments are merely intended to describe the technical solutions of the present disclosure but are not intended to limit the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A data response method, comprising:
   in response to a request for a required service from a terminal device, creating, by a server, a honeypot according to a service type of the required service;
   generating, by the server, encrypted information according to an original honeypot character of the created honeypot, the encrypted information being decryptable by a decryption algorithm agreed between the terminal device and the server, and decryptable by the terminal device using the decryption algorithm, and the original honeypot character being an original plaintext;
   sending, by the server, the encrypted information to the terminal device;
   decrypting, by the terminal device, the encrypted information received from the server, using the decryption algorithm, to obtain decrypted honeypot information;
   sending, by the terminal device, a first honeypot character corresponding to the decrypted honeypot information together with the encrypted information received from the server and user data to the server during a same step, the first honeypot character being a first plaintext and the encrypted information being an encrypted representation of the original plaintext;
   receiving, by the server, the first honeypot character corresponding to the honeypot information decrypted by the terminal device, together with the encrypted information and user data from the terminal device, the encrypted information sent by the terminal to the server being the same encrypted information received by the terminal from the server;
   decrypting, by the server using the decryption algorithm, the encrypted information received from the terminal device, to obtain the original honeypot character from the encrypted information;
   determining, by the server, whether the first honeypot character sent by the terminal device is the same as the original honeypot character decrypted by the server from the encrypted information sent by the terminal device; and
   in response to the first honeypot character being the same as the original honeypot character, responding, by the server, to the user data to provide the required service.

2. The method according to claim 1, wherein after determining whether the first honeypot character sent by the terminal device is the same as the original honeypot character decrypted from the encrypted information, the method further comprises:
   providing no response to the user data in response to the first honeypot character being different from the original honeypot character.

3. The method according to claim 1, wherein before receiving a first honeypot character, the encrypted information, and user data from the terminal device, the method further comprises:
   obtaining the original honeypot character belonging to a target honeypot, wherein the target honeypot is a pre-configured honeypot; and
   encrypting the original honeypot character to generate the encrypted information.

4. The method according to claim 3, wherein before receiving a first honeypot character, the encrypted information, and user data from the terminal device, the method further comprises:
   configuring a honeypot, wherein the honeypot comprises a preset field;
   selecting the honeypot as the target honeypot; and
   assigning a value to the preset field in the target honeypot to generate the original honeypot character.

5. A data response server, comprising: a memory; and a processor coupled to the memory and configured to:
   in response to a request for a required service from a terminal device, create a honeypot according to a service type of the required service;
   generate encrypted information according to an original honeypot character of the created honeypot, the encrypted information being decryptable by a decryption algorithm agreed between the terminal device and the server, and decryptable by the terminal device using the decryption algorithm, and the original honeypot character being an original plaintext;

send the encrypted information to the terminal device to have the encrypted information decrypted by the terminal device using the decryption algorithm to obtain decrypted honeypot information;

receive a first honeypot character corresponding to the honeypot information decrypted by the terminal device, together with the encrypted information and user data from the terminal device, the encrypted information sent by the terminal to the server being the same encrypted information received by the terminal from the server, wherein the first honeypot character and the encrypted information are sent by the terminal device during a same step, the first honeypot character being a first plaintext and the encrypted information being an encrypted representation of the original plaintext;

decrypt, using the decryption algorithm, the encrypted information received from the terminal device, to obtain a second honeypot character from the encrypted information; and determine whether the first honeypot character sent by the terminal device is the same as the original honeypot character decrypted by the server from the encrypted information sent by the terminal device; and in response to the first honeypot character being the same as the original honeypot character, respond to the user data to provide the required service.

6. The server according to claim 5, wherein the processor is further configured to:
not respond to the user data in response to the first honeypot character being different from the original honeypot character.

7. The server according to claim 5, wherein the processor is further configured to:
obtain the original honeypot character belonging to a target honeypot; and
encrypt the original honeypot character, to generate the encrypted information.

8. The server according to claim 7, wherein the processor is further configured to:
configure a honeypot including a preset field; and
select the honeypot as the target honeypot, wherein assign a value to the preset field in the target honeypot, to generate the original honeypot character.

9. A non-transitory computer-readable storage medium storing computer program instructions executable by at least one processor of a server to perform:
in response to a request for a required service from a terminal device, creating a honeypot according to a service type of the required service;
generating encrypted information according to an original honeypot character of the created honeypot, the encrypted information being decryptable by a decryption algorithm agreed between the terminal device and the server, and decryptable by the terminal device using the decryption algorithm, and the original honeypot character being an original plaintext;
sending the encrypted information to the terminal device to have the encrypted information decrypted by the terminal device using the decryption algorithm to obtain decrypted honeypot information;

receiving, from the terminal device, a first honeypot character corresponding to the honeypot information decrypted by the terminal device, together with the encrypted information and user data from the terminal device, the encrypted information sent by the terminal to the server being the same encrypted information received by the terminal from the server, wherein the first honeypot character and the encrypted information are sent by the terminal device during a same step, the first honeypot character being a first plaintext and the encrypted information being an encrypted representation of the original plaintext;

decrypting, using the decryption algorithm, the encrypted information received from the terminal device, to obtain a second honeypot character from the encrypted information;

determining whether the first honeypot character sent by the terminal device is the same as the original honeypot character decrypted by the server from the encrypted information sent by the terminal device; and responding to the user data to provide the required service, in response to the first honeypot character being the same as the original honeypot character.

10. The storage medium according to claim 9, wherein the computer program instructions further cause the at least one processor to perform:
providing, by the server, no response to the user data in response to the first honeypot character being different from the original honeypot character.

11. The storage medium according to claim 9, wherein the computer program instructions further cause the at least one processor to perform:
obtaining, by the server, the original honeypot character belonging to a target honeypot, wherein the target honeypot is a preconfigured honeypot.

12. The storage medium according to claim 11, wherein the computer program instructions further cause the at least one processor to perform:
encrypting, by the server, the original honeypot character to generate the encrypted information.

13. The storage medium according to claim 12, wherein the computer program instructions further cause the at least one processor to perform:
configuring a honeypot, by the server, wherein the honeypot comprises a preset field.

14. The storage medium according to claim 13, wherein the computer program instructions further cause the at least one processor to perform:
selecting the honeypot, by the server, as the target honeypot; and
assigning, by the server, a value to the preset field in the target honeypot to generate the original honeypot character.

15. The method according to claim 1, further comprising:
determining, by the server, the service type of the required service; and
creating, by the server, the honeypot from at least one honeypot that matches the service type.

16. The method according to claim 1, wherein the service type includes at least one of an authentication type service or an Internet banking transaction type service.

* * * * *